(No Model.)
C. LENZ.
CURTAIN HOLDER.
No. 577,436. Patented Feb. 23, 1897.
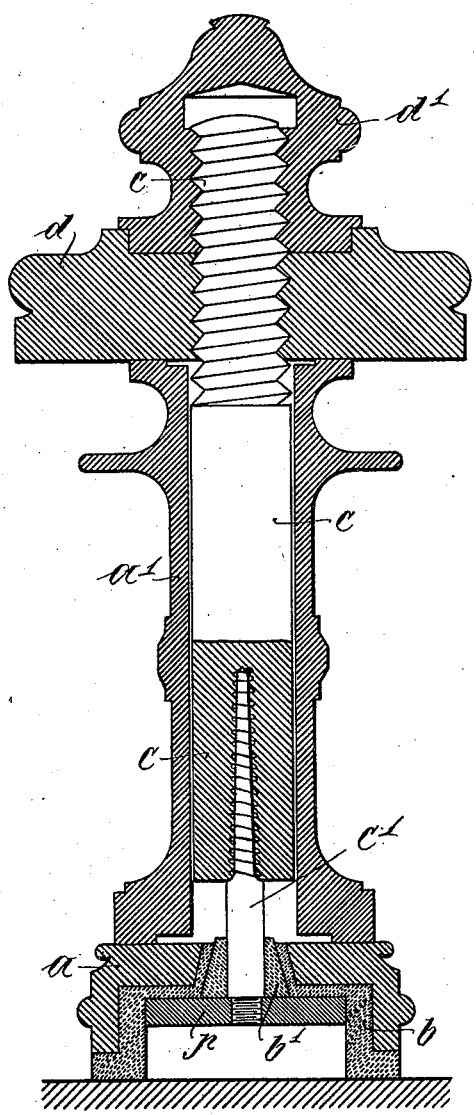
Witnesses:
Emil Kayser
Karl Marscheider.
Inventor
Carl Lenz
by
Robert Deifler
Attorney.

UNITED STATES PATENT OFFICE.

CARL LENZ, OF ZURICH, SWITZERLAND.

CURTAIN-HOLDER.

SPECIFICATION forming part of Letters Patent No. 577,436, dated February 23, 1897.

Application filed July 11, 1896. Serial No. 598,852. (No model.)

*To all whom it may concern:*

Be it known that I, CARL LENZ, a citizen of the Confederation of Switzerland, and a resident of Zurich, Switzerland, have invented certain new and useful Improvements in Curtain-Holders, of which the following is an exact specification.

This invention refers to curtain-holders of that kind in which the fastening of the holder to a wall is to be effected by a pneumatic device adapted to cause a vacuum in a space or chamber provided within the foot of the holder. My improvements in curtain-holders of said kind relate to certain combinations and arrangements of parts, as are all more fully described hereinafter; and the object of my improvements is to effect the fastening of the holder in a most simple manner or by most simple means, respectively.

In order to make my invention more clear, I refer to the accompanying drawing, in which I have shown a longitudinal section through a curtain-holder constructed according to my invention. Said curtain-holder is constructed as follows:

The curtain-holder proper consists of the foot $a$, the shank $a'$, and the head $d\ d'$, which latter in the form of construction shown consists of two parts $d$ and $d'$. Said head is screwed into a wooden bolt $c$, the greatest portion of which is situated within the shank $a'$ and may be displaced within said shank.

The base portion of the foot $a$ is provided with a chamber or cavity into which is inserted an elastic body or box $b$, consisting of india-rubber or a similar material, and adapted to afford a practically perfect tightening between the foot $a$ and the wall which the curtain-holder is to be fixed to. The box $b$ contains a piston $p$, which is rigidly connected with the wooden bolt $c$ aforementioned by a pin $c'$. The length of the bolt $c$ is so chosen that the inner end surface of the bolt is as far distant from the opposite or front surface of the foot $a$ as is the piston $p$ from the wall, provided all parts of the curtain-holder be in their normal position. If, therefore, the two parts of the head $d\ d'$ are loosened or unscrewed for a distance corresponding to one or the other of the two distances just mentioned, the bolt $c$, together with the piston $p$, may be displaced in the direction to the foot $a$, or, more precisely, to the base of said foot, respectively, so as to cause the piston $p$ to lie flush with the base portion of the elastic casing or box $b$. Supposing the movable parts just mentioned be in this position and the whole curtain-holder be held against the wall, then the curtain-holder may be securely fixed to the place chosen by turning the head $d\ d'$, or at first the part $d$ only of the head, back into their or its normal position, so as thereby to cause a displacement of the bolt or piston-rod $c$, as well as of the piston $p$, in the reverse way. The piston $p$ is thus drawn inward or into the elastic box $b$, respectively, and there is thus produced a vacuum within said box or between the piston and the wall, respectively.

I prefer to draw the piston $p$ inward or the wooden bolt or piston-rod $c$ outward only by the part $d$ of the head, and to secure the parts $c$ and $d$ in their proper relative position by then screwing the part $d'$ of the head against the part $d$; but I wish it to be understood that I do not confine myself to letting the head consist of two parts, as it will be sufficient in many cases if the two parts $d\ d'$ are made in one piece. I prefer, further, to arrange a conical packing-body $b'$ between the shank of the pin $c'$ and the opposite portion of the elastic body $b$. The height of said packing-ring is a little greater than the space to be filled by this ring, and the purpose of said greater height is to enable the piston $p$ to effect automatically a tightening around the shank $c'$ when said piston has nearly reached the inner end of its path. On pressing the piston $p$ outward the inner end surface of the bolt $c$ pushes upon the projecting portion of the packing-ring $b'$ and causes a slight displacement of the same. A similar displacement, but in the reverse direction, is thereafter caused by the piston $p$, as just described.

Having thus fully described the nature of this invention, what I desire to secure by Letters Patent of the United States is—

In a curtain-holder having an elastic foot, a cavity provided within the latter and opening to the base-surface of the same, a piston arranged within said cavity, a rod secured to said piston and passing through the top part of said foot, and means for longitudinally displacing said rod, the combination with the latter and with the portion of said top part surrounding said rod, of a conical packing situated between the latter and said portion; said packing exceeding in length the thickness of the said top part, and means for longitudinally displacing the said packing, substantially as described.

In testimony whereof I have signed this specification in the presence of two subscribing witnesses.

CARL LENZ.

Witnesses:
   HANS LENZ,
   AUGUST LENZ.